United States Patent
Kimura (10) Patent No.: US 8,447,844 B2
(45) Date of Patent: May 21, 2013

(54) COMMUNICATION APPARATUS AND COMMUNICATION METHOD

(75) Inventor: Manabu Kimura, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 797 days.

(21) Appl. No.: 12/205,974

(22) Filed: Sep. 8, 2008

(65) Prior Publication Data

US 2009/0067347 A1   Mar. 12, 2009

(30) Foreign Application Priority Data

Sep. 12, 2007   (JP) ................................. 2007-237074

(51) Int. Cl.
*G06F 15/16* (2006.01)
*G06F 15/177* (2006.01)
*G06F 15/173* (2006.01)

(52) U.S. Cl.
USPC ........... 709/220; 709/204; 709/217; 709/224; 709/227

(58) Field of Classification Search
USPC .................................................. 709/223, 220
See application file for complete search history.

(56) References Cited

U.S. PATENT DOCUMENTS

| | | | |
|---|---|---|---|
| 6,862,619 B1 * | 3/2005 | Sugauchi et al. | 709/224 |
| 7,392,299 B2 * | 6/2008 | Maekawa | 709/220 |
| 8,250,136 B2 * | 8/2012 | Maekawa et al. | 709/203 |
| 2003/0081621 A1 * | 5/2003 | Godfrey et al. | 370/400 |
| 2003/0131111 A1 * | 7/2003 | Kimura et al. | 709/228 |
| 2003/0134637 A1 * | 7/2003 | Cooper | 455/435 |
| 2004/0015573 A1 * | 1/2004 | Yuki et al. | 709/220 |
| 2005/0143082 A1 * | 6/2005 | Yang | 455/452.1 |
| 2006/0015585 A1 * | 1/2006 | Okada | 709/219 |
| 2007/0038929 A1 * | 2/2007 | Miyazawa | 715/517 |
| 2007/0047567 A1 * | 3/2007 | Suzuki | 370/420 |
| 2007/0249344 A1 * | 10/2007 | Hosono et al. | 455/435.1 |
| 2009/0204707 A1 * | 8/2009 | Kamegaya et al. | 709/224 |
| 2010/0082137 A1 * | 4/2010 | Suzuki et al. | 709/217 |

FOREIGN PATENT DOCUMENTS

| | | |
|---|---|---|
| JP | 2004-295632 | 10/2004 |
| JP | 2004-362523 | 12/2004 |

* cited by examiner

*Primary Examiner* — Ian N Moore
*Assistant Examiner* — Jenee Alexander
(74) *Attorney, Agent, or Firm* — Oblon, Spivak, McClelland, Maier & Neustadt, L.L.P.

(57) ABSTRACT

A storage unit stores therein setting information and history information on a communication established by the setting information. When an information receiving unit receives new setting information, a judging unit judges whether the setting information stored in the storage unit reached a predetermined value. A determining unit compares the history information corresponding to the setting information, and determines a priority for each setting information based on a result of comparison. A deleting unit deletes setting information having the lowest priority from the storage unit, and a storing unit stores the new setting information in the storage unit.

11 Claims, 10 Drawing Sheets

| ASSOCIA-TION ID | ASSOCIATION INFORMATION ||| HISTORY INFORMATION ||| PRIORITY DEGREE |
| --- | --- | --- | --- | --- | --- | --- | --- |
| | HOST ID | DEVICE ID | CONNEC-TION KEY | COMMUNI-CATION FREQUENCY | COMMUNI-CATION ESTABLISHED TIME | TRANS-MISSION/ RECEPTION ENDING TIME | |
| A1 | H1 | D1 | K1 | 5 | 11:00 | 11:00 | INTERMEDIATE |
| A2 | H2 | D1 | K2 | 1 | 12:30 | 13:00 | LOW |
| A3 | H3 | D1 | K3 | 2 | 12:00 | 14:00 | LOW |
| A4 | H4 | D1 | K4 | 4 | 8:00 | 12:45 | HIGH |
| A5 | H5 | D1 | K5 | 3 | 9:00 | 10:30 | MOST PRIORITIZED |

COMMUNICATION APPARATUS AND COMMUNICATION METHOD

CROSS-REFERENCE TO RELATED APPLICATIONS

The present document incorporates by reference the entire contents of Japanese priority document, 2007-237074 filed in Japan on Sep. 12, 2007.

BACKGROUND OF THE INVENTION

1. Field of the Invention

The present invention relates to a communication apparatus and a communication method for transmitting and receiving data through an established communication.

2. Description of the Related Art

Recently, a technique of connecting apparatuses by wireless communication such as a wireless universal serial bus (W-USB) standard, and transmitting and receiving data has become common. With the connection of the apparatuses using such wireless communication, a user can instruct printing of data from a portable terminal apparatus mounted with a communication unit such as radio-frequency identification (RFID), Bluetooth™, a wireless local area network (LAN), the W-USB, in addition to a portable telephone network to a printer that also has a same communication unit through non-contact communication. Therefore, the above connection is highly convenient.

Because the data is transmitted and received by wireless, the instruction to print the data using the above wireless communication needs to identify the output destination of the data when a plurality of printers that are capable of accepting the instruction to print from the portable terminal apparatus are present. For W-USB, a process called "association" is executed in advance and, thereby, the setting information necessary for establishing communication such as the ID of each apparatus and information on the key are exchanged between the apparatuses that execute the communication. The setting information stored in each apparatus due to this process enables the identification of the output destination.

Japanese Patent Application Laid-open No. 2004-362523 proposes, as to a storage apparatus that communicates with an information apparatus by wireless, a technique of enabling exclusion of users not undoubtedly having access authorization using inerasable authentication information by storing authentication information necessary for identifying a user in a read only memory (ROM) area.

When setting information obtained in the association of W-USB or the authentication information such as the one in Japanese Patent Application Laid-open No. 2004-362523 is stored in a storing apparatus, the number of pieces of information that can be stored in a storing apparatus is limited because the capacity of the storing apparatus that is the storage destination is limited.

However, in the method of Japanese Patent Application Laid-open No. 2004-362523, the case where the number of pieces of authentication information reaches the upper limit storable number is not taken into account and, therefore, a problem has arisen that normal communication with an information apparatus that requests connection after number of pieces of information reaches the upper limit number can not be executed. When the number of pieces of information reaches the upper limit number, a measure can be considered of, for example, deleting authentication information not used. However, according to Japanese Patent Application Laid-open No. 2004-362523, even such a measure can not be taken because the authentication information is basically stored in the inerasable ROM area.

When the stored information is deleted, it is desirable, for example, to judge whether the information is not used as above or whether the information is used at low frequency, and to control to leave the necessary information stored.

SUMMARY OF THE INVENTION

It is an object of the present invention to at least partially solve the problems in the conventional technology.

According to an aspect of the present invention, there is provided a communication apparatus that transmits and receives data through a communication with other communication apparatus. The communication apparatus includes a storage unit that stores therein setting information for establishing a communication and history information on the communication established by the setting information in an associated manner; an information receiving unit that receives new setting information; a judging unit that, when the new setting information is received, judges whether number of pieces of setting information stored in the storage unit reached a predetermined value; a determining unit that, when it is judged that the number of pieces of setting information reached the predetermined value, compares the history information corresponding to the setting information stored in the storage unit, and determines a priority for each setting information based on a result of comparison; a deleting unit that, when the priority is set for each setting information, deletes setting information having a lowest priority from the storage unit; and a storing unit that stores the new setting information in the storage unit.

Furthermore, according to another aspect of the present invention, there is provided a communication method for a communication apparatus that transmits and receives data through a communication with other communication apparatus. The communication apparatus includes a storage unit that stores therein setting information for establishing a communication and history information on the communication established by the setting information in an associated manner. The communication method includes receiving new setting information; judging, when the new setting information is received, whether number of pieces of setting information stored in the storage unit reached a predetermined value; determining including, when it is judged that the number of pieces of setting information reached the predetermined value, comparing the history information corresponding to the setting information stored in the storage unit, and determining a priority for each setting information based on a result of comparison; deleting, when the priority is set for each setting information, setting information having a lowest priority from the storage unit; and storing the new setting information in the storage unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings.

A communication apparatus according to a first embodiment, when the number of pieces of setting information to establish communication reaches the upper limit number, determines priority of each setting information according to communication history information such as the frequency of transmission and reception of data, and a time period elapsed after completion of establishing the communication or after completion of data transmission/reception, and the apparatus deletes the setting information each having low priority.

Description will be given below taking an example of the case where a communication apparatus is realized as a multifunctional machine that is a so-called "multifunction peripheral (MFP)" that consolidates therein its functions such as a copying function, a facsimile (FAX) function, a printing function, a scanner function, and a function of distributing an input image (a manuscript image read by the scanner function or an image input by the FAX function). The MFP communicates with a host apparatus such as a notebook-type personal computer by wireless according to the W-USB standard and the peripheral transmits and receives data for image processing.

Figure 1:
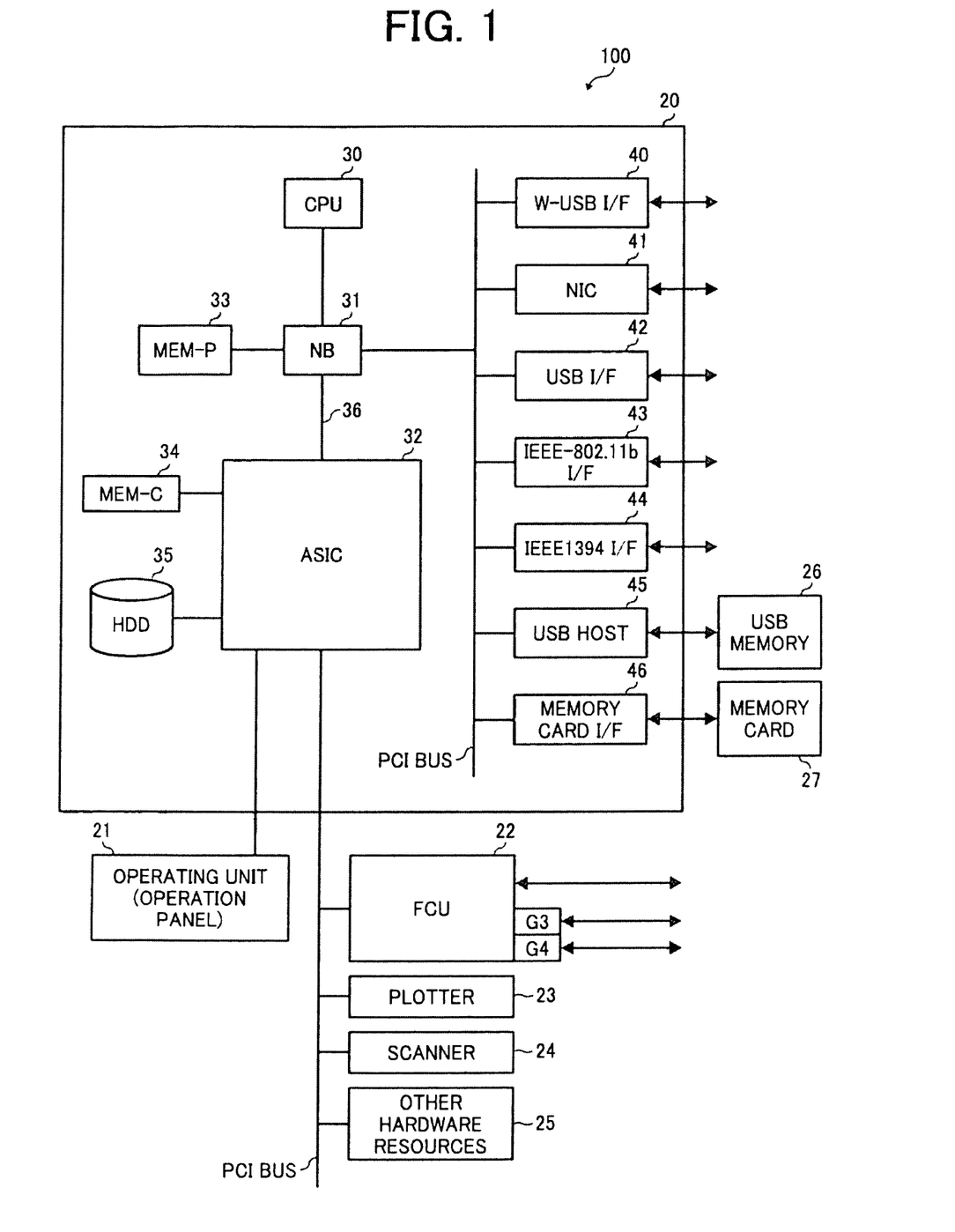
FIG. 1 is a block diagram of the hardware configuration of an MFP according to a first embodiment of the present invention.

FIG. 1 is a block diagram of the hardware configuration of an MFP 100 according to the first embodiment. As shown in FIG. 1, the MFP 100 is configured by connecting a controller 20, a plotter 23, a scanner 24, and other hardware resources 25 using a peripheral component interconnect (PCI) bus.

The controller 20 is a controller that controls the MFP 100 and also controls input from a drawing, communicating, and an operating unit (operation panel) 21. The plotter 23 is a printer engine, etc., connectable to the PCI bus such as, for example, a black/white plotter, a one-drum color plotter, or a four-drum color plotter. The scanner 24 is a scanner that is conventionally used in a multifunction peripheral. The other hardware resources 25 are various electronic apparatuses equipped in the MFP 100. The other hardware resources 25 include an image processing portion executing error diffusion, gamma conversion, etc.

The controller 20 includes a CPU 30, a northbridge (NB) 31, a system memory (MEM-P) 33, a local memory (MEM-C) 34, an application specific integrated circuit (ASIC) 32, and a hard disk drive (HDD) 35, and an accelerated graphics port (AGP) bus 36 connects the NB 31 and the ASIC 32.

The CPU 30 controls the MFP 100. The CPU 30 has a chip set including the NB 31 and the MEM-P 33 and the CPU 30 is connected to another apparatus through this chip set.

The NB 31 is a bridge to connect the CPU 30, the MEM-P 33, and the AGP bus 36 and the NB 31 includes a memory controller that controls reading from and writing into the MEM-P 33, a PCI master, and an ACP target.

The NB 31 may be connected to peripheral devices through the PCI bus. For example, through the PCI bus, the NB 31 is connected to a W-USB interface (I/F) 40, a network interface card (NIC) 41, a USB I/F 42, an IEEE 802.11b I/F 43, an IEEE 1394 I/F 44, a USB host 45, and a memory card I/F 46. The USB host 45 detects connection with a USB device and exchanges data with a USB memory 26. The memory card I/F 46 detects connection with a memory card 27 and exchanges data with the memory card 27.

The MEM-P 33 is a system memory that is used as a memory for storing a program or data, a memory for expanding a program or data, a memory for drawing of a printer, etc. The MEM-P 33 includes a read only memory (ROM) and a random access memory (RAM) (not shown). The ROM is a read-only memory that is used as a memory for having programs and data stored therein. The RAM is a writable and readable memory that is used as a memory for expanding a program or data, a memory for drawing of a printer, etc.

The ASIC 32 is an Integrated Circuit (IC) for uses in image processing, which has hardware elements for image processing. The ASIC 32 also plays a role of a bridge that respectively connects it with the AGP bus 36, the PCI bus, the HDD 35, and the MEM-C 34. The ASIC 32 includes a PCI target and an AGP master, an arbiter (ARB) that is the core of the ASIC 32, a memory controller that controls the MEM-C 34, a plurality of direct memory access controllers (DMAC) that execute rotation of image data, etc., using hardware logics, etc., and a PCI unit that transfers data between the ASIC 32 and electronic apparatuses such as the plotter 23 and the scanner 24, through the PCI bus. The ASIC 32 is connected to a FAX control unit (FCU) 22 through the PCI bus.

The MEM-C 34 is a local memory that is used as an image buffer for copying and a symbol buffer. The HDD 35 is storage to accumulate image data, programs, font data, and forms.

The AGP bus 36 is a bus I/F for a graphics accelerator card that is proposed to increase the speed of graphic processing, and the AGP bus 36 increases the speed of a graphics accelerator card by directly accessing the MEM-P 33 at high throughput.

FIG. 1 depicts an example of the hardware configuration. The MFP 100 may be configured to use PCI-express for connection instead of the PCI bus and the MFP 100 may also be configured to include other various I/Fs such as Bluetooth and wireless LAN. The operating unit 21 is a component that displays a message to a user and accepts input from a user.

Figure 2:
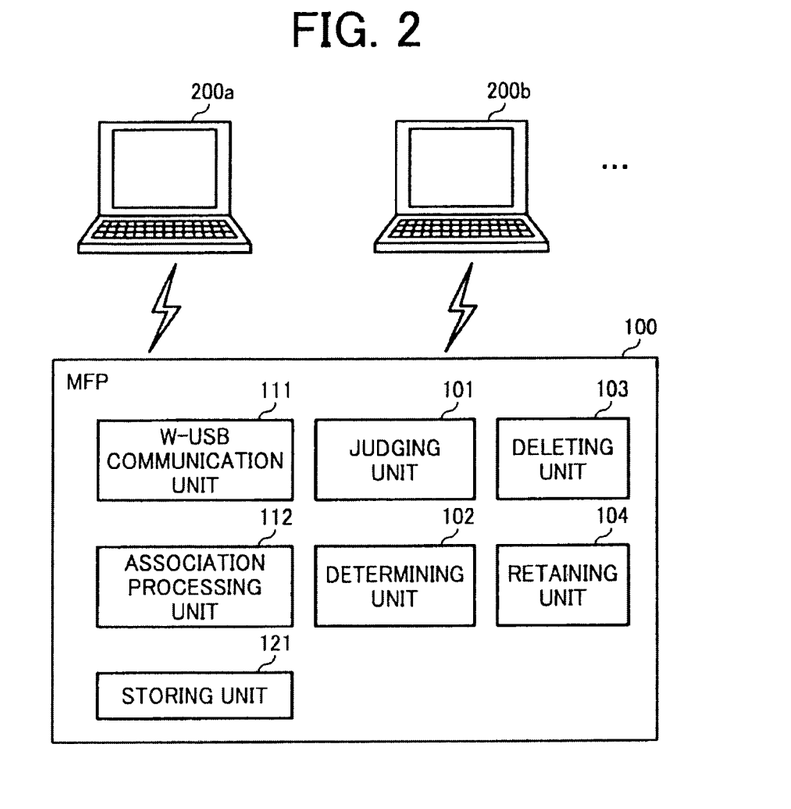
FIG. 2 is a block diagram of the software configuration of the MFP according to the first embodiment.

Description will be given for the software configuration of the MFP 100. FIG. 2 is a block diagram of the software configuration of the MFP 100 according to the first embodiment. As shown in FIG. 2, the MFP 100 includes a storage unit 121, a W-USB communication unit 111, an association processing unit 112, a judging unit 101, a determining unit 102, a deleting unit 103, and a storing unit 104.

Figure 3:
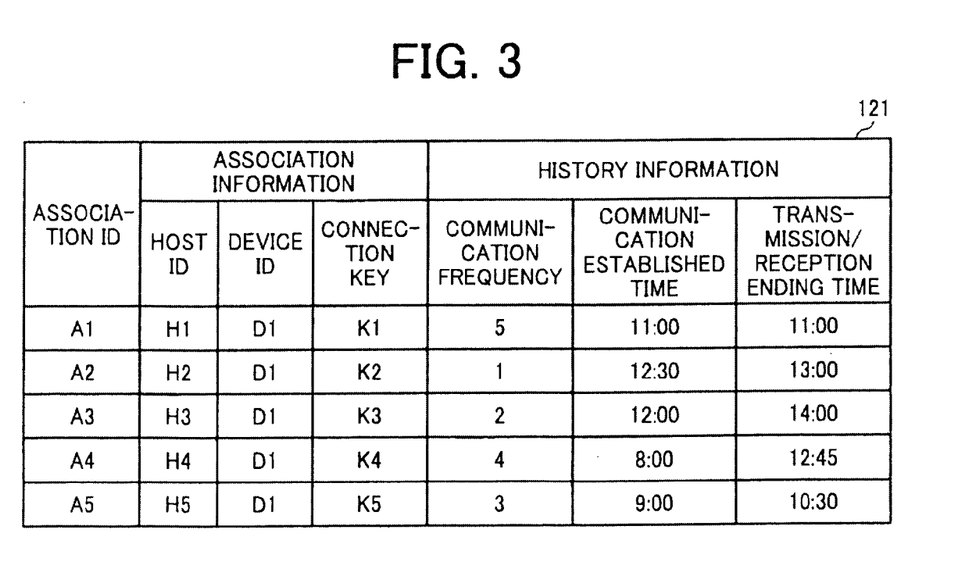
FIG. 3 is an explanatory view of an example of the data structure of data stored in a storing unit of the first embodiment.

The storage unit 121 stores a plurality of association information and history information each on the communication established using the association information, correlating the two with each other. FIG. 3 is an explanatory view of an example of the data construction of data stored in the storage unit 121 of the first embodiment.

As shown in FIG. 3, the storage unit 121 stores data that correlates each of association IDs that respectively identify the association information, each association information, and each history information, with each other.

Association information includes: host IDs each identifying a host apparatus that is a communication counterpart such as a personal computer (PC) 200a or 200b (hereinafter, "PC 200"); a device ID that identifies the MFP 100, and a connection key to be used for establishing communication. The association information is necessary information to establish communication according to the W-USB standard and the information may include another piece of information. When another communication standard is applied, the storage unit 121 may be configured to store the setting information necessary for establishing communication according to that standard instead of the association information.

The history information includes the communication frequency, the communication established time, and the transmission/reception ending time. The communication frequency means the frequency at which data is transmitted and received through communication established using the association information. The communication established time means the time at which the establishment of communication using the association information is finally completed. The transmission/reception ending time means the time at which the transmission/reception of data through the communication established using the association information is finally completed. The date and the time may be stored instead of the time.

The storage scheme of the association information and the history information is not limited to the above and, for example, above pieces of information may respectively be stored in different storing units and the pieces may be correlated by an ID, etc. The history information is not limited to the above and each of various types of information may be stored as history information when each of the various types of information indicates the history of the communication content of the communication established using the association information. As to the history information, all of the communication frequency, the communication established time, and the transmission/reception ending time do not need to be stored, and the minimal information necessary for determining the priority only has to be stored.

The storage unit 121 may be configured by any of various storing medium commonly used such as an HDD, an optical disk, a memory card, and a RAM. That is, the storage unit 121 corresponds to the HDD 35, the MEM-P 33, etc., shown in FIG. 1.

Returning to FIG. 2, the W-USB communication unit 111 transmits and receives various types of data used for image processing to/from the PC 200 that is the communication counterpart according to the W-USB standard.

The association processing unit 112 executes the association process between the association processing unit 112 and the communication counterpart such as the PC 200 according to the W-USB standard. The association processing unit 112 accepts the association information obtained in the association process as another piece of association information to be newly stored.

The judging unit 101 judges, when the new association information is obtained, whether the number of pieces of association information stored in the storage unit 121 reaches the upper limit number.

The determining unit 102 determines, when the number of pieces of association information stored in the storage unit 121 reaches the upper limit number, the priority of each association information by referring to the history information. The details of the determining method of the priority will be described later.

The deleting unit 103 deletes an association information having the lowest priority from the storage unit 121. The storing unit 104 stores the newly obtained association information in the storage unit 121.

Figure 4:
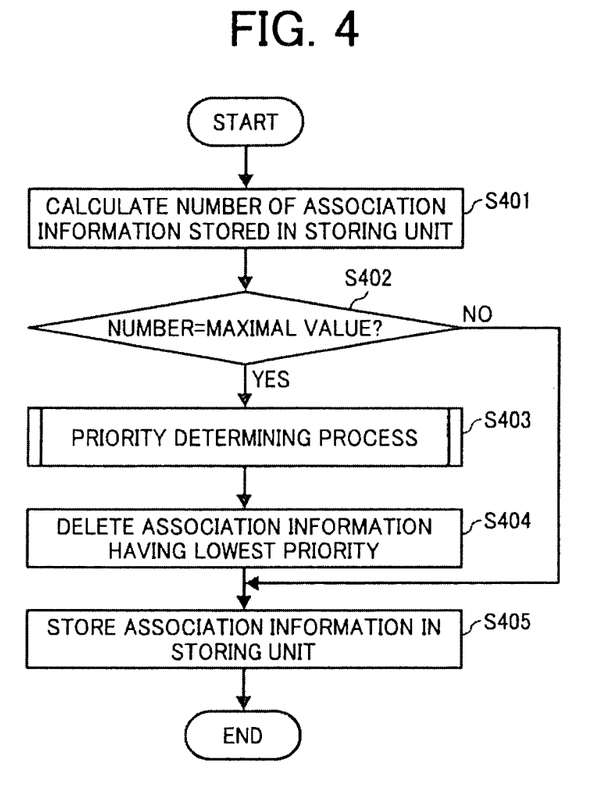
FIG. 4 is a flowchart of the entire flow of an association information managing process of the first embodiment.

Description will be given for an association information managing process by the MFP 100 according to the first embodiment configured as above. FIG. 4 is a flowchart of the entire flow of the association information managing process of the first embodiment. The association information managing process is executed when the association processing unit 112 executes the association process between the association processing unit 112 and a host apparatus such as the PC 200 and an association information to be newly added occurs.

When the association information to be added is obtained by the association processing unit 112, the judging unit 101 calculates the number of pieces of association information stored in the storage unit 121 (step S401). The judging unit 101 judges whether the calculated number coincides with a predetermined maximum value (step S402).

When the number coincides with the maximum value (YES at step S402), a priority determining process of determining the priority of each association information is executed by referring to the history information (step S403). The details of the priority determining process will be described later.

After the priority determining process, the deleting unit 103 deletes the association information having the lowest priority from the storage unit 121 (step S404).

After deleting the association information, or when it is judged that the number does not coincides with the maximum value at step S402 (NO at step S402), the storing unit 104 stores in the storage unit 121 the association information obtained by the association processing unit 112 (step S405) and the association information managing process comes to an end.

Figure 5:
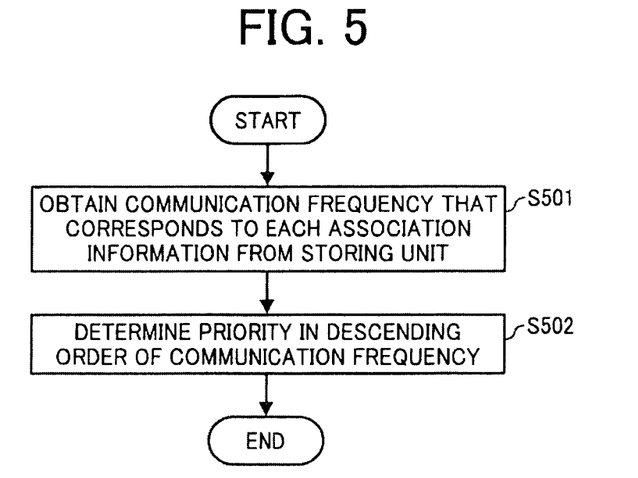
FIG. 5 is a flowchart of the entire flow of a priority determining process in the first embodiment.

Description will be given for the details of the priority determining process at step S403. FIG. 5 is a flowchart of the entire flow of the priority determining process of the first embodiment. FIG. 5 shows an example of the priority determining process executed when the priority is determined using the communication frequency.

The determining unit 102 obtains the communication frequency that corresponds to each association information, from the storage unit 121 (step S501). The determining unit 102 determines the priority of each association information such that higher priority is determined for a higher communication frequency (step S502).

Figures 6, 7:
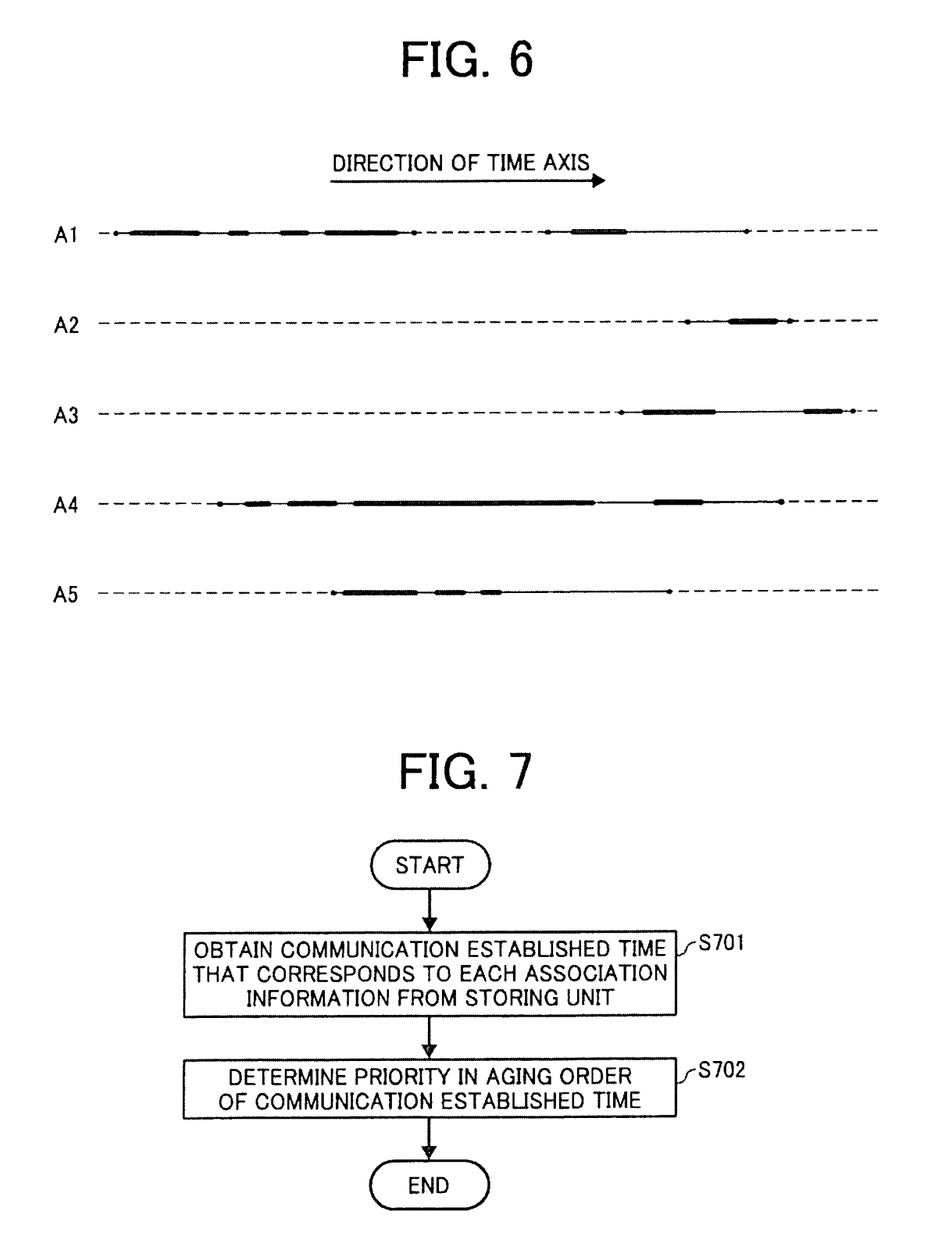
FIG. 6 is an explanatory schematic chart of a specific example of a determining method of the priority.
FIG. 7 is a flowchart of another example of the priority determining process in the first embodiment.

FIG. 6 is an explanatory schematic chart of a specific example of the determining method of the priority. FIG. 6 shows the state of transmission and reception of data by the communication established using five association information respectively having association IDs of A1, A2, A3, A4, and A5.

In FIG. 6, each of thin solid lines that has black circles on its both ends represents a section for which communication is established using the association information. That is, the black circle on the left end of a thin solid line represents a time point at which the communication starts and the black circle on the right end of the thin solid line represents a time point at which the communication ends.

Each of thick solid lines represents a section for which transmission and reception of data are executed between a host apparatus such as the PC 200 and the MFP 100 while the communication is being established. The transmission or the reception of data corresponds to the case such as, for example, where the PC 200 transmits print data to the MFP 100.

A line corresponding to the association information A1 includes five thick solid lines. Therefore, the communication frequency thereof is "five". Similarly, the communication frequencies respectively of A2, A3, A4, and A5 are respectively one, two, four, and three.

That is, when the trace of execution of establishment of the communication and the transmission and reception of data between the host apparatus and the MFP 100 is shown as in FIG. 6 for each of the association information A1 to A5, the determining unit 102 determines priority for each of A1, A4, A5, A3, A2 in this order of descending priority.

By determining the priority using the communication frequency as above, the association information of the host apparatus that frequently transmits and receives data to/from the MFP 100 can be left undeleted in the storage unit 121 with priority.

The determining method of the priority is not limited to the method that uses the communication frequency. For example, the priority may be determined using the communication established time or the transmission/reception ending time that is included in the history information. The priority may also be determined using a combination of plural types of information.

Description will be given for a method of determining the priority using the communication established time. FIG. 7 is a flowchart of another example of the priority determining process in the first embodiment.

The determining unit 102 obtains the communication established time that corresponds to each association information from the storage unit 121 (step S701). The determining unit 102 determines the priority in aging order of the communication established time (step S702).

In the example of FIG. 6, the position of a black circle on the left end of a thin solid line corresponds to a communication established time. When the communication is established for a plurality of times, the position of a black circle corresponding to the latest communication corresponds to a communication established time. The determining unit 102 determines the priority of the association information such that a piece having the position of a black circle on the left end that is positioned more rightward has higher priority. That is, in the example of FIG. 6, priority is given to each of A2, A3, A1, A5, and A4 in this order of descending priority.

Figure 8:
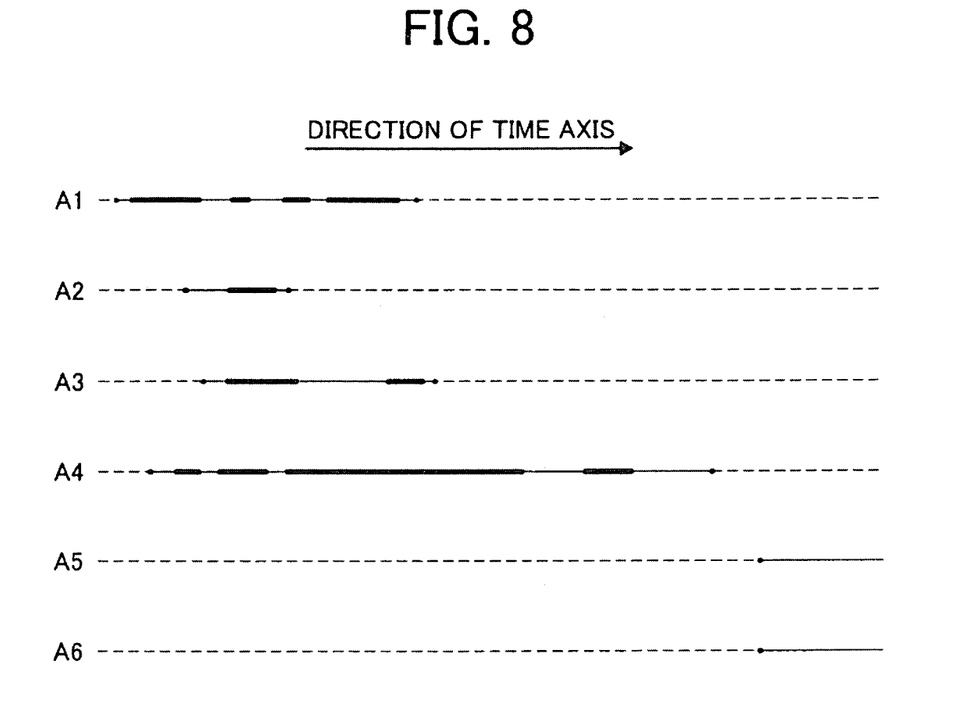
FIG. 8 is an explanatory schematic chart of a specific example of a priority determining method.

When the priority is determined using only the communication frequency as FIG. 5, a problem may arise in the state where a plurality of association information are added substantially at the same time as shown below. FIG. 8 is an explanatory schematic chart of a specific example of a priority determining method for the case where such a problem arises.

In this case, it is assumed that the storage unit 121 can hold up to five association information and that the storage unit 121 currently holds four association information (A1 to A4). The case is considered where two association information A5 and A6 are added in this order substantially at the same time in the above state.

In this case, A5 is first added to the storage unit 121 and, at this time point, the number of pieces of association information that the storage unit 121 holds reaches the upper limit number. When A6 is added next, the determining unit 102 determines the priority of each of A1 to A5. Because the determining unit 102 determines the priority using only the communication frequency, the priority of A5 that has the communication frequency of zero becomes lowest. Therefore, A5 is deleted, and A6 that is obtained after this deletion is consequently added.

Though both of A5 and A6 are originally to be added to the storage unit 121, the method of determining the priority using only the communication frequency does not enable this addition as above.

Therefore, the priority determination may be configured to avoid the above problem by combining the method of determining the priority using the communication frequency as in FIG. 5 and the method of determining the priority using the communication established time as in FIG. 7. That is, the priority is determined first by the communication established time and, when an association information for which no priority can be determined is present as the result of the above method, the priority of the association information is determined using the communication frequency.

By configuring as above, even in the case such as the one of FIG. 8, when A6 is added after A5 is added, A1 having the oldest communication established time may be deleted. That is, both of A5 and A6 may be added.

By determining the priority using the communication established time as above, the latest association information can be left undeleted in the storage unit 121 with priority.

Figure 9:
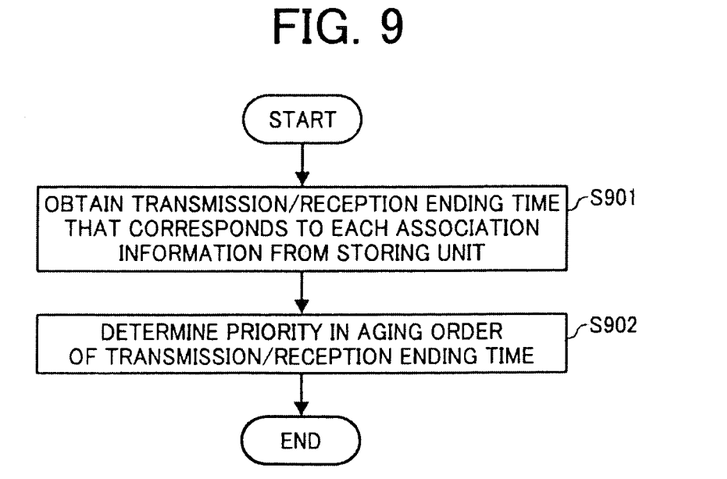
FIG. 9 is a flowchart of another example of the priority determining process in the first embodiment.

Description will be given for a method of determining the priority using the transmission/reception ending time. FIG. 9 is a flowchart of another example of the priority determining process in the first embodiment.

The determining unit 102 obtains the transmission/reception ending time that corresponds to each association information from the storage unit 121 (step S901). The determining unit 102 determines the priority in aging order of the transmission/reception ending time (step S902).

In the example of FIG. 6, the position of a black circle on the right end of a thick solid line corresponds to a transmission/reception ending time. When data is transmitted/received for a plurality of times, the position of the right end of a thick solid line that is located most rightward and that corresponds to the latest data transmission/reception corresponds to a transmission/reception ending time. The determining unit 102 determines the priority such that an association information having the position of the right end of a thick solid line, which is positioned more rightward has higher priority. That is, in the example of FIG. 6, priority is given to each of A3, A2, A4, A1, and A5 in this order of descending priority.

By determining the priority using the transmission/reception ending time as above, the latest association information can be left undeleted in the storage unit 121 with priority. Thereby, for example, when communication is again desired using an association information used in the latest data communication, the probability for the association information to be left undeleted in the storage unit 121 can be increased.

As above, the communication apparatus according to the first embodiment enables, when the number of pieces of setting information to establish communication reaches the storable upper limit number, determination of the priority of each setting information corresponding to the history information of communication, and also enables deletion of setting information having low priority. Thereby, the necessary setting information can be properly managed and, therefore, the connectivity of the communication can be improved.

A communication apparatus according to a second embodiment is configured for a user to be able to designate the priority degrees of the stored setting information and, thereby, the apparatus determines the setting information to be deleted according to the priority degree designated and the priority determined.

Figure 10:
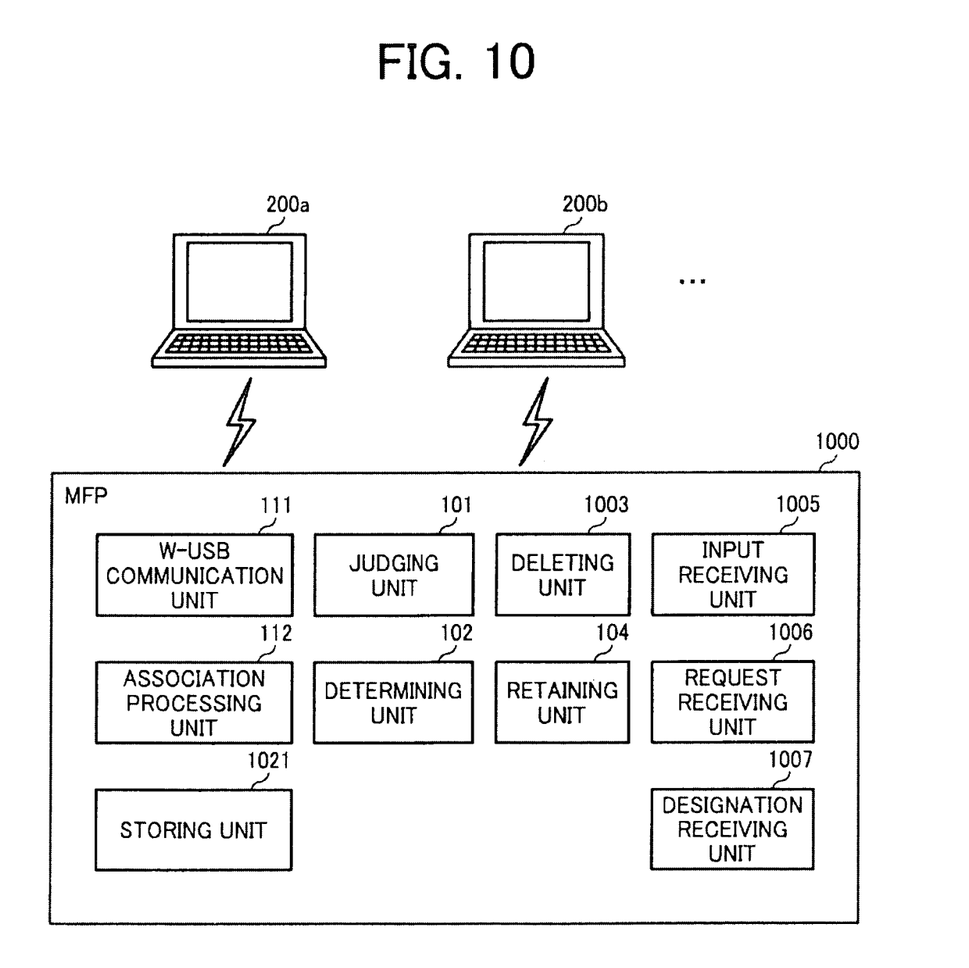
FIG. 10 is a block diagram of the software configuration of an MFP according to a second embodiment of the present invention.

FIG. 10 is a block diagram of the software configuration of an MFP 1000 according to the second embodiment. As shown in FIG. 10, the MFP 1000 includes a storing unit 1021, the W-USB communication unit 111, the association processing unit 112, the judging unit 101, the determining unit 102, a deleting unit 1003, the storing unit 104, an input receiving unit 1005, a request receiving unit 1006, and a designation receiving unit 1007.

The second embodiment is different from the first embodiment in that the second embodiment is added with the function of the deleting unit 1003, that the second embodiment is also added with the input receiving unit 1005, the request receiving unit 1006, and the designation receiving unit 1007, and that the data structure of the storing unit 1021 is different. Other components and functions are same as those in FIG. 2 that shows the software configuration of the MFP 100 according to the first embodiment and, therefore, those items are given the same reference numerals and the description therefor is omitted.

Figure 11:
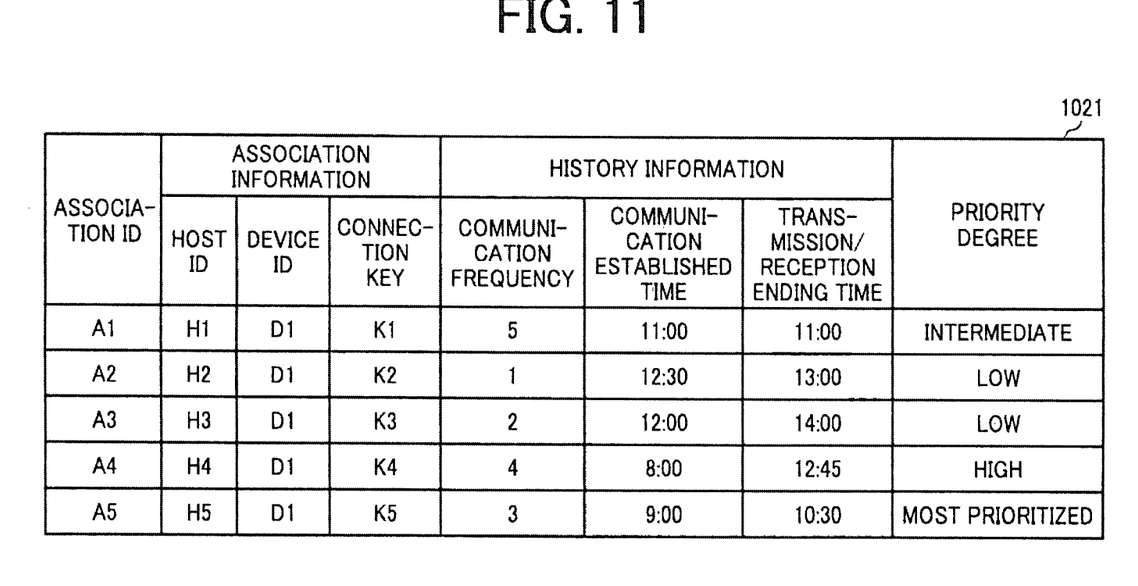
FIG. 11 is an explanatory chart of an example of the data structure of data stored in a storing unit of the second embodiment.

The storing unit 1021 is different from the storage unit 121 of the first embodiment in that the storing unit 1021 further stores the priority degree of each association information, which is designated by a user. FIG. 11 is an explanatory chart of an example of the data structure of data stored in the storing unit 1021.

As shown in FIG. 11, the storing unit 1021 has stored therein the data that correlates each association information with its priority degree. A priority degree represents the degree of giving precedence to an association information over others and the priority degree is designated stepwise using, for example, "low", "intermediate", "high", or "most prioritized". The designating method of a priority degree is not limited to this and various methods conventionally used such as a method of designating with numerical values may be applied. Setting of "most prioritized" and deletion of the association information for which "most prioritized" is set may also be adapted to be able to be executed only by manual operation of a user.

The deleting unit 1003 determines an association information to be deleted based on the priority degree stored in the storing unit 1021 and the priority determined by the determining unit 102, and the deleting unit 1003 deletes the determined association information from the storage unit 121. For example, the deleting unit 1003 deletes the association information having the lowest priority of the association information having the smallest priority degree from the storage unit 121. The deleting unit 1003 may be adapted to take into account only the priority degree set by a user and to delete the association information for which the lowest priority degree is set, from the storage unit 121. The deleting unit 1003 may also be adapted to delete the association information having the smallest priority degree of the association information having the lowest priority.

The deleting unit 1003 may be adapted, in the case where a highest degree of "most prioritized" is set, when the priority determined for the corresponding association information is the lowest priority, not to delete the association information. Thereby, the association information that a user desires to leave always undeleted can properly be protected.

The input receiving unit 1005 receives input about the priority degree by a user. The input receiving unit 1005 receives a priority degree designated by a user, for example, on a priority degree setting screen displayed on the operation panel of FIG. 1.

Figure 12:
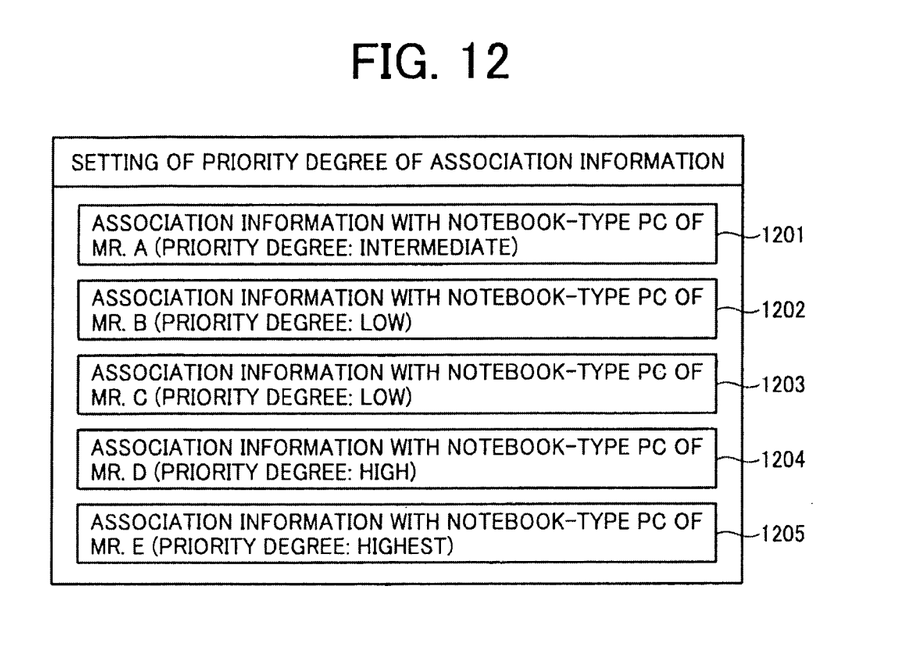
FIG. 12 depicts an example of a priority degree setting screen.

FIG. 12 depicts an example of a priority degree setting screen of the association information. FIG. 12 depicts an example where five association information held in the storage unit 121 are displayed.

Buttons 1201 to 1205 respectively correspond to the association information and the priority degrees respectively of the association information are displayed. When a priority degree is changed, a user presses down a button that corresponds to the association information for which the priority degree is changed, from the priority degree setting screen.

Figure 13:
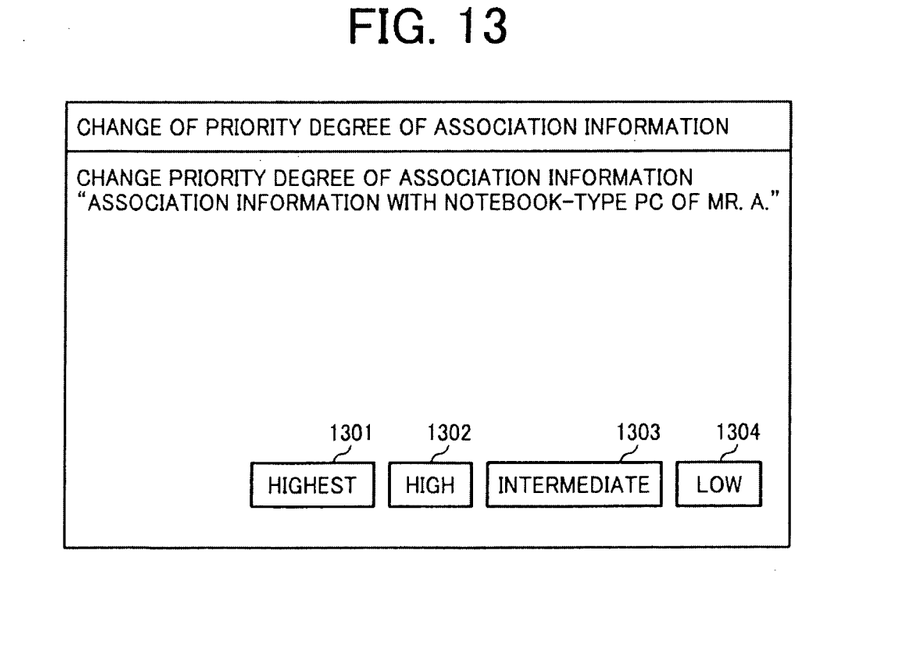
FIG. 13 depicts an example of a priority degree change screen.

FIG. 13 depicts an example of a priority degree change screen displayed when each of the buttons of FIG. 12 is pressed down. FIG. 13 depicts an example of a priority degree change screen displayed when the button 1201 is pressed down in FIG. 12.

A user designates the priority degree to be changed from the priority degree change screen. More specifically, the priority degree to be set is selected by pressing down any one of buttons 1301 to 1304 that respectively correspond to the priority degrees.

After the user completes the setting of the priority degree, the user updates the priority degree of the corresponding association information stored in the storage unit 121, to the designated priority degree and the user returns to the priority degree setting screen of FIG. 12. For example, when the user presses down a button for "high" in the priority degree change screen of FIG. 13, the display of the button 1201 of the priority degree setting screen of FIG. 12 is changed from "Association Information with the Notebook-Type PC of Mr. A (Priority Degree: Intermediate)" to "Association Information with the Notebook-Type PC of Mr. A (Priority Degree: High)".

The request receiving unit 1006 receives a deletion request of an association information. The request receiving unit 1006 receives a deletion request of the association information designated by a user in the deletion screen displayed on the operation panel of FIG. 1.

Figure 14:
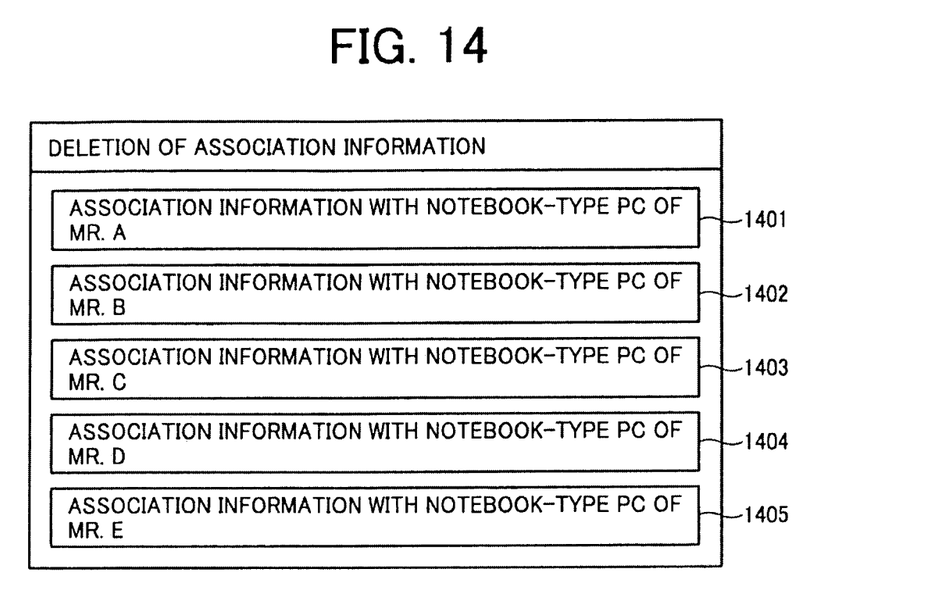
FIG. 14 depicts an example of a deletion screen.

FIG. 14 depicts an example of the deletion screen of an association information. FIG. 14 depicts an example where the storage unit 121 can hold up to five association information and the storage unit 121 actually has stored therein five association information.

Buttons 1401 to 1405 corresponds to the association information. When an association information is deleted, a user presses down a button that corresponds to the association information for which the priority degree is changed, from the deletion screen.

Figure 15:
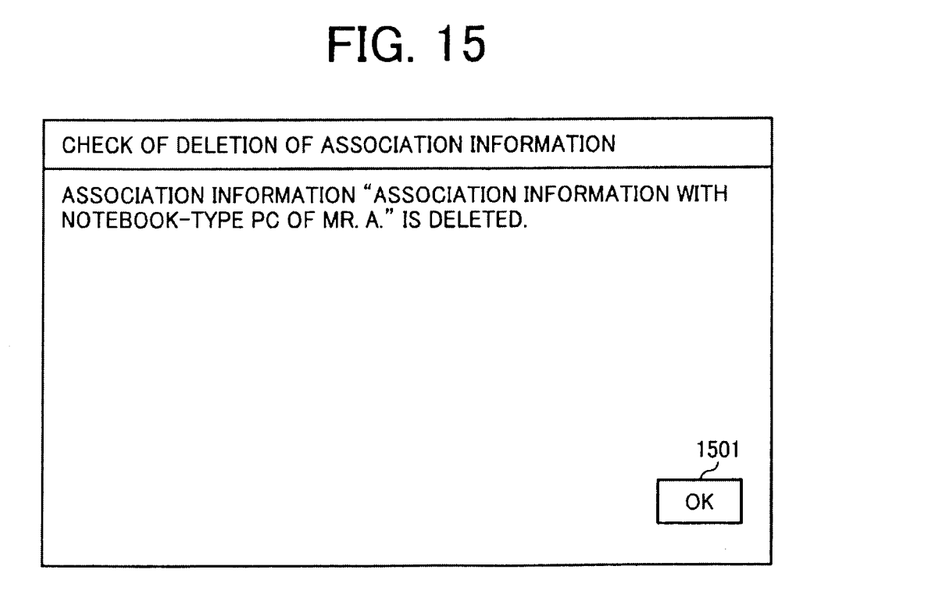
FIG. 15 depicts an example of a deletion check screen.

FIG. 15 depicts an example of a deletion check screen displayed when each of the buttons of FIG. 14 is pressed down. FIG. 15 depicts an example of the deletion check screen displayed when the button 1401 is pressed down of FIG. 14. When an OK button 1501 is pressed down in the deletion check screen, the designated association information is deleted from the storage unit 121.

The designation receiving unit 1007 receives designation of a deleting method of an association information. More specifically, the designation receiving unit 1007 receives designation for either one of the cases where the user deletes by manual operation (hereinafter, "manual scheme") or where deletion is executed according to the priority determined from the history information as above (hereinafter, "automatic scheme"). The designation receiving unit 1007 can receive designation of the deleting scheme selected by the user, for example, in a deletion scheme selection screen displayed on the operation panel of FIG. 1.

Figure 16:
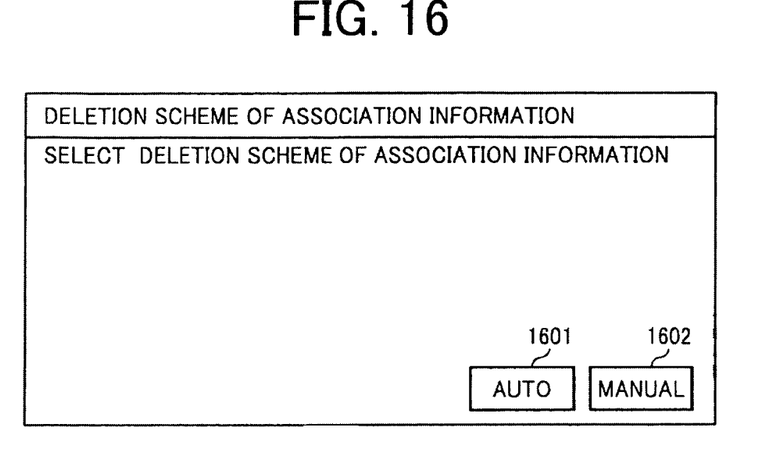
FIG. 16 depicts an example of a deletion scheme selection screen.

FIG. 16 depicts an example of the deletion scheme selection screen. When an "AUTO" button 1601 is pressed down, that the deletion scheme is the automatic scheme is written into a predetermined storing unit such as the MEM-P 33. When a "MANUAL" button 1602 is pressed down, that the deletion scheme is the manual scheme is written into the predetermined storing unit.

In the case where the automatic scheme is selected, when it is judged that the number of pieces of association information in the storage unit 121 reaches the upper limit value, the association information is deleted according to the priority determined from the history information by the process as shown in FIG. 4. On the other hand, in the case where the manual scheme is selected, when it is judged that the number reaches the upper limit value, the deletion screen as FIG. 14 is displayed and the association information designated in the deletion screen is deleted.

Though the load on the person who manages the apparatus becomes small when the automatic scheme is selected, the association information necessary for a user may be deleted while another user uses the apparatus for a long time. That is, meticulous management of the association information corresponding to the requests of users may not be realized.

On the other hand, though the load on the person who manages the apparatus becomes large when the manual scheme is selected, for example, proper priority can be set such that the association information necessary for a user is not deleted. That is, the meticulous management of the association information corresponding to the requests of users can be realized.

Figure 17:
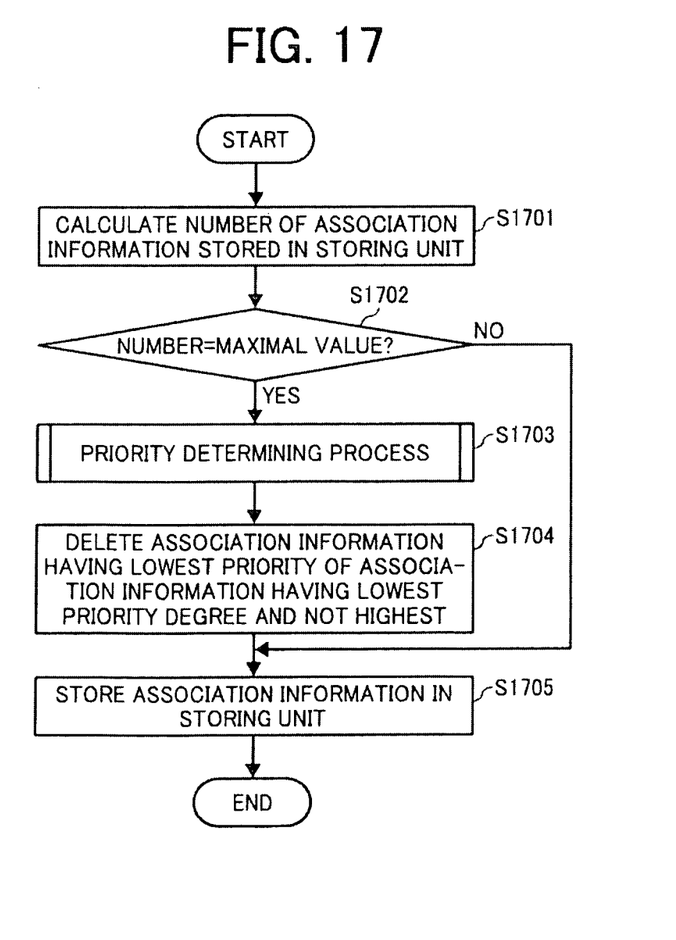
FIG. 17 is a flowchart of the entire flow of an association information managing process in the second embodiment.

Description will be given for an association information managing process by the MFP 1000 according to the second embodiment configured as above. FIG. 17 is a flowchart of the entire flow of the association information managing process in the second embodiment.

In the second embodiment, only step S1704 is different from the association information managing process of the first embodiment. Other steps S1701 to S1703 and S1705 are same as steps S401 to S403 and S405 in the MFP 100 according to the first embodiment and, therefore, the description therefor is omitted.

At step S1704, the deleting unit 1003 deletes an association information having the lowest determined priority of the association information each having the smallest priority degree (step S1704).

As above, the communication apparatus according to the second embodiment enables a user to designate the priority degree of each recorded setting information, and also enables determination of the setting information to be deleted according to the designated priority degree and the determined priority. Thereby, the connectivity of the communication can be improved according to the designation of the user.

Because the communication apparatus according to the second embodiment enables manual deletion of an association information, a user is enabled to manage association information. The communication apparatus according to the second embodiment further is able to select either one of the automatic scheme and the manual scheme as the deletion scheme of an association information. Thereby, for example, selection of a proper deletion scheme is enabled by, for example, giving precedence to either one of reduction of load of the information management and information management corresponding to the user's requests.

According to an aspect of the present invention, when the number of pieces of stored information to be used in communication reaches the upper limit number, the connectivity of the communication can be improved by deleting information each having low priority.

Furthermore, according to another aspect of the present invention, the connectivity of communication can be improved according to designation of a user by enabling the user to designate the priority degree of each information.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication apparatus that transmits and receives data through a communication with other communication apparatus, the communication apparatus comprising:

a storage unit that stores therein setting information for establishing a communication and history information on the communication established by the setting information in an associated manner;

an information receiving unit that receives new setting information;

a judging unit that, when the new setting information is received, judges whether number of pieces of setting information stored in the storage unit reached a predetermined value;

a setting unit that sets a method, from a plurality of methods, used by a determining unit to determine a priority for each setting information;

the determining unit that, when it is judged that the number of pieces of setting information reached the predetermined value, compares the history information corresponding to the setting information stored in the storage unit, and determines the priority for each setting information based on a result of comparison;

a deleting unit that, when the priority is set for each setting information, deletes setting information having a lowest priority from the storage unit; and a storing unit that stores the new setting information in the storage unit, wherein the determining unit determines the priority for each setting information using a first method with high priority set by the setting unit, and determines the priority for each setting information using a second method with lower priority when the determining unit cannot determine the priority for each setting information using the first method with high priority, wherein when more than one piece of setting information is received substantially simultaneously and the number of pieces of setting information reaches the predetermined value, the determining unit determines the priority for each setting information based on communication frequency if the priority for each setting information cannot be determined based on communication established time, and wherein the history information is a frequency at which data is transmitted and received through the communication established by the setting information, and the determining unit determines the priority for each setting information such that a priority of setting information with a high frequency is higher than a priority of setting information with a low frequency.

2. The communication apparatus according to claim 1, wherein the history information is date and time at which the communication is established by the setting information, and the determining unit determines the priority for each setting information such that a priority of setting information with a new date and time is higher than a priority of setting information with an old date and time.

3. The communication apparatus according to claim 1, wherein the history information is date and time at which data is transmitted and received through the communication established by the setting information, and the determining unit determines the priority for each setting information such that a priority of setting information with a new date and time is higher than a priority of setting information with an old date and time.

4. The communication apparatus according to claim 1, further comprising an input receiving unit that receives an input of a degree of priority for each setting information stored in the storage unit, wherein the deleting unit deletes setting information with a lowest degree of priority from the storage unit.

5. The communication apparatus according to claim 4, wherein the deleting unit deletes setting information with the lowest priority and the lowest degree of priority from the storage unit.

6. The communication apparatus according to claim 4, wherein the deleting unit compares the degree of priority with a predetermined threshold value, and deletes setting information with the lowest degree of priority, which is lower than the threshold value, and the lowest priority from the storage unit.

7. The communication apparatus according to claim 1, further comprising a request receiving unit that receives a request for deleting the setting information, wherein the deleting unit deletes setting information for which the request is received from the storage unit.

8. The communication apparatus according to claim 7, further comprising a designation receiving unit that receives a designation to delete the setting information either when the request is received or when the new setting information is received, wherein if the designation receiving unit receives the designation when the request is received, the deleting unit deletes the setting information for which the request is received from the storage unit, and if the designation receiving unit receives the designation when the new setting information is received, the deleting deletes the setting information having the lowest priority from the storage unit.

9. A communication method for a communication apparatus that transmits and receives data through a communication with other communication apparatus, the communication apparatus including a storage unit that stores therein setting information for establishing a communication and history information on the communication established by the setting information in an associated manner, the communication method comprising:

receiving new setting information;

judging, when the new setting information is received, whether number of pieces of setting information stored in the storage unit reached a predetermined value;

setting a method, from a plurality of methods, used to determine a priority for each setting information;

determining including, when it is judged that the number of pieces of setting information reached the predetermined value, comparing the history information corresponding to the setting information stored in the storage unit, and determining the priority for each setting information based on a result of comparison;

deleting, when the priority is set for each setting information, setting information having a lowest priority from the storage unit; and storing the new setting information in the storage unit, wherein the priority for each setting information is determined using a first method with high priority which is set, and the priority for each setting information using a second method with lower priority when the priority for each setting information cannot be determined using the first method with high priority, wherein when more than one piece of setting information is received substantially simultaneously and the number of pieces of setting information reaches the predetermined value, the priority for each setting information is determined based on communication frequency if the priority for each setting information cannot be determined based on communication established time, and wherein the history information is a frequency at which data is transmitted and received through the communication established by the setting information, and the determining determines the priority for each setting information such that a priority of setting information with a high frequency is higher than a priority of setting information with a low frequency.

10. The communication apparatus according to claim 1, wherein the setting information includes a host ID which identifies a host apparatus, a device ID which identifies a multifunctional machine, and a connection key which establishes communication between the host apparatus and the multifunctional machine.

11. The communication apparatus according to claim 10, wherein the multifunctional machine includes a plotter and a scanner.

* * * * *